UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

FLAMING-ARC ELECTRODE.

1,035,119. Specification of Letters Patent. Patented Aug. 6, 1912.

No Drawing. Continuation in part of application Serial No. 576,523, filed August 10, 1910. This application filed January 27, 1912. Serial No. 673,752.

*To all whom it may concern:*

Be it known that I, EMILE J. GUAY, a citizen of the United States, residing at Lynn, in the county of Essex, State of Massachusetts, have invented certain new and useful Improvements in Flaming-Arc Electrodes, of which the following is a specification.

It has been found that an arc from an electrode in which titanium carbid is the principal light-producing constituent emits conspicuously white light and is very efficient. Such an arc, however, is unsteady, and, in order to render it steady, I have incorporated other materials with the titanium carbid. Free carbon, calcium fluorid and cryolite, I have found to be particularly useful in steadying and generally improving the titanium carbid arc, and these materials I have added in varying proportions to the titanium carbid. Free carbon renders the electrode more conductive, while the calcium fluorid and cryolite fuse with the titanium carbid and carbon and maintain the amounts of carbid and carbon that enter into the arc substantially constant. In this manner the intensity of the arc is made substantially invariable. In addition to this, the calcium fluorid and carbon increase the diameter of the arc, while the cryolite adds a small amount of yellow rays to the same, which is frequently desirable.

An electrode made as above indicated, I have described in my prior application, No. 576,523, filed August 10, 1910, of which this application is a continuation in part. In that prior application, the free carbon which is added to the titanium carbid is not specifically defined, but my practice was to use coke, and with this form of free carbon I have found that the best results are obtained when the proportions of the ingredients are as follows:—titanium carbid, 35 per cent., calcium fluorid, 30 per cent., cryolite, 15 per cent., carbon, 20 per cent. I have also found that while when coke is used as the free carbon these proportions seem to furnish the best results, small variations are permissible without seriously affecting the appearance and steadiness of the arc. Thus, I have found that a variation of 5 per cent. either way in the amount of titanium carbid and calcium fluorid and a variation either way of 3 per cent. in the amount of cryolite and carbon is permissible.

I have now discovered that by the use of a certain carbon mixture in place of coke, pure and simple, the resulting electrode is considerably improved; the intensity of the light emitted by the arc is rendered still more uniform and the amounts of the admixtures of titanium carbid, calcium fluorid and cryolite can be considerably reduced and may generally be varied within a wider range than was practicable with the use of coke, pure and simple, as the free carbon constitutent. The carbon mixture which secures this improved result is made up by taking 20 parts of lampblack, 80 parts of finely divided coke and 25 parts of a carbonizable binding material, such as pitch. These proportions, however, may be varied considerably so long as a substantial amount of lampblack is retained. These materials are thoroughly mixed and the mixture is baked until the binder has become carbonized. The compound thus formed is then ground and constitutes the carbon mixture which in my improvement replaces the coke, pure and simple, which I have heretofore used.

With the use of the specified carbon mixture, I have made electrodes giving superior results in the following proportions of constituents:—titanium carbid, 28 per cent., calcium fluorid, 24 per cent., cryolite, 10 per cent., carbon mixture, 38 per cent. From this mixture the electrode is prepared in the ordinary manner by adding to the mixture a suitable binder, squirting or molding the resulting paste into rods and baking the same until the binder becomes carbonized. I prefer to inclose the rods thus formed in a shell of carbon. This may be done by squirting the mixture into a previously prepared carbon shell; or else the rods formed of the mixture are lightly baked and are then coated with tar and again baked whereby a carbon shell or mantle is formed on its surface. It is old in the art to inclose an electrode within a carbon shell and I do not claim any novelty as to this feature.

When my improved electrode is used with direct current, it is preferable to use it as the positive electrode and a plain carbon as the negative; but when used with alternating current, both electrodes will generally be made in accordance with my invention.

The permissible variations of constituents, when my improved carbon mixture is used, are within wide limits; in fact, no lower limit of the amounts of light-giving materials can be assigned, since very small amounts of titanium carbid, calcium fluorid and cryolite will still secure a practically constant light. The upper limit of the permissible amounts of light-giving constituents is that quantity which with the current employed would give an excessive amount of slag, which would render the operation of the electrode unsatisfactory.

A particular advantage of my improved electrode is that it is adapted to be used on commercial circuits of 110 volts. The arc is run at 75 to 80 volts, and ordinarily with a current strength of from 4 to 6 amperes. In this manner a single lamp may be used on a 110 volt circuit instead of two in series, as is often required with electrodes of this character, which are usually run at 40 to 50 volts at the arc.

What I claim as new, and desire to secure by Letters Patent of the United States, is:—

1. An electrode composed of titanium carbid, calcium fluorid, cryolite, and carbon.

2. A flaming arc electrode composed of carbon and a predominating amount of a mixture of titanium carbid, calcium fluorid and cryolite.

3. An electrode composed of titanium carbid, calcium fluorid, cryolite and a carbon mixture of coke, lampblack and a carbonized binder.

4. A flaming arc electrode containing a carbon mixture of lampblack, coke and a carbonized binder, and a predominating amount of a mixture of titanium carbid, calcium fluorid and cryolite.

5. An electrode containing the following constituents in substantially the following proportions:—titanium carbid, 28 per cent.; calcium fluorid, 24 per cent.; cryolite, 10 per cent.; and carbon, 38 per cent.

6. A flaming arc electrode containing a carbon mixture composed of 20 parts of lampblack, 80 parts of coke and the carbonized residue of 25 parts of a binder, and a predominating amount of a mixture of titanium carbid, calcium fluorid and cryolite.

7. A carbon mixture for flaming arc electrodes composed of lampblack, coke and the carbonized residue of a binder.

8. A carbon mixture for flaming arc electrodes composed of 20 parts of lampblack, 80 parts of coke and the carbonized residue of 25 parts of a binder.

In witness whereof, I have hereunto set my hand this 25th day of January, 1912.

EMILE J. GUAY.

Witnesses:
JOHN A. MCMANUS, Jr.,
FRANK G. HATTIE.